United States Patent
Chao et al.

(10) Patent No.: US 6,801,673 B2
(45) Date of Patent: Oct. 5, 2004

(54) SECTION EXTRACTION TOOL FOR PDF DOCUMENTS

(75) Inventors: Hui Chao, San Jose, CA (US); Henry Sang, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 09/972,055

(22) Filed: Oct. 9, 2001

(65) Prior Publication Data

US 2003/0068099 A1 Apr. 10, 2003

(51) Int. Cl.$^7$ ............................. G06K 9/20; G06F 15/00
(52) U.S. Cl. ...................... 382/282; 707/100; 715/523
(58) Field of Search ................................ 382/190, 282, 382/305, 306, 229; 358/1.17, 1.18; 715/522, 523, 530, 911; 707/100, 200, 101, 10

(56) References Cited

U.S. PATENT DOCUMENTS

| | | | |
|---|---|---|---|
| 5,896,462 A | * 4/1999 | Stern | 382/306 |
| 5,963,669 A | 10/1999 | Wesolkowski et al. | 382/206 |
| 6,035,061 A | 3/2000 | Katsuyama et al. | 382/177 |
| 6,044,375 A | 3/2000 | Shmueli et al. | 707/101 |
| 6,073,148 A | * 6/2000 | Rowe et al. | 715/542 |
| 6,583,890 B1 | * 6/2003 | Mastie et al. | 358/1.18 |
| 6,633,890 B1 | * 10/2003 | Laverty et al. | 707/203 |
| 6,654,758 B1 | * 11/2003 | Teague | 707/101 |
| 6,708,309 B1 | * 3/2004 | Blumberg | 715/530 |
| 6,732,102 B1 | * 5/2004 | Khandekar | 707/10 |

FOREIGN PATENT DOCUMENTS

| | | |
|---|---|---|
| EP | 0890898 | 1/1999 |

OTHER PUBLICATIONS

Hui Chao et al.; "PDF Document Layout Study with Page Elements and Bounding Boxes"; Hewlett–Packard Labs, Imaging Systems Laboratory; 3 pages, Sep., 2001.

Hui Chao et al: "PDF Document Layout Study with Page Elements and Bounding Boxes" Workshop on Document Layout Interpretation and its Applications, Online! Sep. 9, 2001, XP002249458 http://www.science.uva.nl/events/dlia retrieved on Jul. 28, 2003.

"Copying and Pasting text and graphics to another application" ADOBE ACROBAT V3.0 Helpfile 1997, XP002249459.

Liang J et al: "Document layout structure extraction using bounding boxes of different entites" Applications of Computer Vision, 1996. WACV '96. Proceedings3rd IEEE Workshop on Sarasota, FK USA Dec. 2–4, 1996, Los Alamitos, CA USA XP010206444.

* cited by examiner

*Primary Examiner*—Kanji Patel

(57) ABSTRACT

A method of extracting a section of a page from a portable document format file ("pdf"): The method includes receiving indication of a user-defined region on a pdf file page, designating an extraction region including all elements determined to be within the user-defined region, and placing the extraction region into a new file. The method may also include determining if one or more elements on the pdf page are within the user-defined region by applying inclusion rules based on whether an element's bounding box is within or intersects the user-defined region. The method may also include verifying the accuracy of the extraction by converting the user-defined region in the original pdf document and the extracted region to bitmap images and comparing the two bitmap images, bit by bit.

20 Claims, 4 Drawing Sheets

SECTION EXTRACTION TOOL FOR PDF DOCUMENTS

FIELD OF THE INVENTION

The invention is generally related to electronic data files. More particularly, the invention is related to extraction of a section of a portable document format document.

BACKGROUND OF THE INVENTION

Electronic files may be created using a variety of techniques. Thus, it may be desirable to store data from an electronic file in a format that is independent of the process used to create it so that it may be accessible to a range of users. One format that allows such access is the portable document format. The portable document format ("pdf") is a file format for representing documents in a manner independent of the application software, hardware, and operating system used to create the documents and independent of the output device on which they are displayed or printed.

A PDF workflow assumes a one-way production process where the PDF file contains a rendition that is laid out for final presentation, i.e., no logical structural information is preserved. Consequently, one problem with storing documents in a pdf format is that it is difficult to reuse parts of documents because elements with semantic affinity are not stored as one logical group of elements. Although it is possible to store the original editable document as an attribute in the PDF file, this is not generally done, since the original program for creating the pdf document is unavailable anyway, or because this introduces a vulnerability for computer viruses. Without the original editable document, removing a portion of the pdf document for use in another document or file is not easily accomplished. For example, it may be desirable for a user to insert a graph or chart from a pdf document into a document of the user's own creation or make a slide presentation with the graph or chart. The PDF specification makes an allowance to include structural information, however, very few pdf documents are created with such structural information due to size constraints and/or creation processes. Thus, most pdf documents do not generally support sharing or repurposing the content of the document and it is generally not possible to extract a figure, an illustration or a paragraph from a chapter as an integrated object from PDF.

There are a few techniques available for reusing pdf document content. However, some of these processes are complicated and require extensive user interaction, while others extract a raster rendition of the selected document portion from the display bitmap, thereby losing all original document structure and attribute information, as well as resolution, which is usually limited to the 72 dpi screen resolution.

SUMMARY OF THE INVENTION

An aspect of an embodiment of the invention is to provide a method for extracting a section of a portable document format ("pdf") document.

In one embodiment, the method may include receiving indication of a user defined region on a pdf file page, determining if each element on the pdf page is within the user defined region, designating an extraction region including all elements determined to be within the user defined region, and placing the extraction region into a new pdf file.

Those skilled in the art will appreciate these and other advantages and benefits of various embodiments of the invention upon reading the following detailed description of preferred embodiments with reference to the below-listed drawings.

Another aspect of the invention includes checking the extracted region for accuracy. In one embodiment, both the extracted region and the region in the original document may be converted to bitmap images and compared bit by bit.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to obscure unnecessarily the invention.

Figure 1:
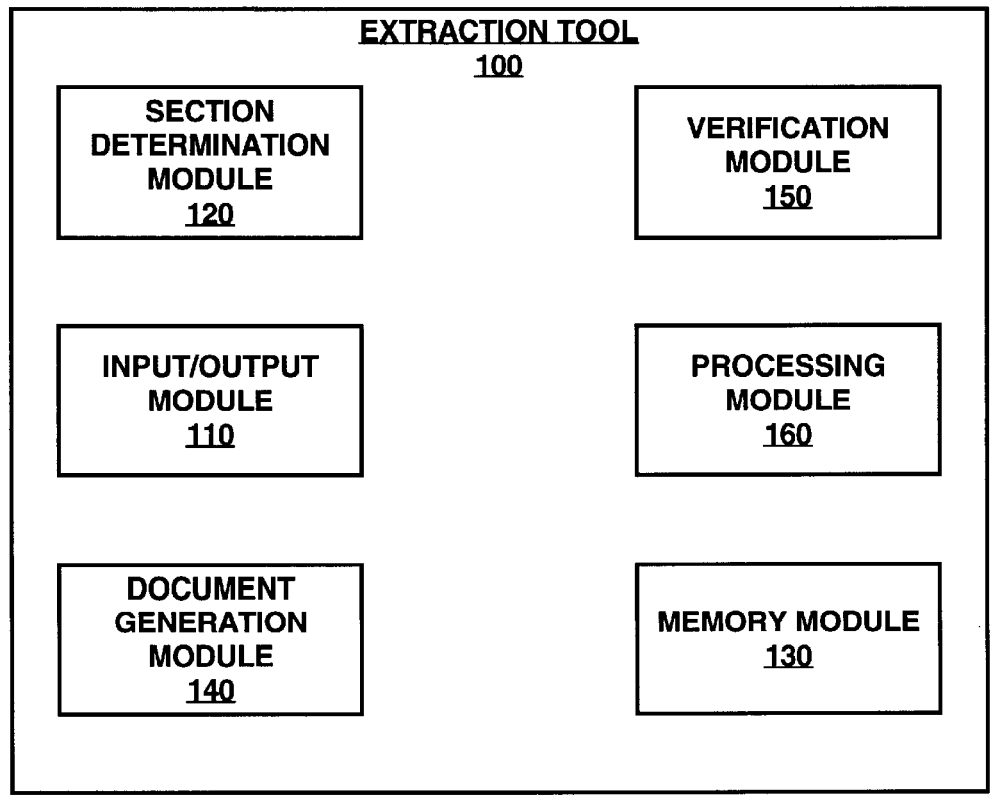
FIG. 1 is a block diagram illustrating one embodiment of an extraction tool.

FIG. 1 is a block diagram illustrating one embodiment of an extraction tool. Extraction tool 100 may include an input/output module 110, a section determination module 120, a memory module 130, a document generation module 140, a verification module 150 and processing module 160. The modules 110–160 are shown to be located within extraction tool 100 for conceptual purposes only. In other embodiments, one or more of the modules 110–160 may reside outside of the extraction tool 100 and may be called upon by the extraction tool 100 as needed.

The input/output module 110 may accept instructions from a user, such as instructions for extracting a section of a portable document format file. These instructions may include the user drawing a box or other shape to outline the section of the pdf file the user would like to extract to a new document, such as a new pdf file. The input/output module 110 may also present the user with instructions or messages regarding the performance of the extraction, such as, for example presenting the user with a message regarding the accuracy of the extraction, as described below with regard to FIG. 3.

The section determination module 120 may determine what elements of the pdf file should be included in the new document. For example, if the user defined region includes parts of elements, the section determination module 120 may apply rules of inclusion to determine if the element should be included in the region to be extracted to the new document.

The memory module 130 may be used to store image information, data, instructions or any other information usable for extracting a section of a pdf file. For example, the memory may be used to store the user defined region while the section determination module 120 determines what elements will be included in the extraction region.

The document generation module 140 may generate the new document by extracting the elements in the region determined by the section determination module 120 into the new document. In one embodiment, the new document generation module 140 may extract the elements in the extraction region into a new pdf file.

The verification module 150 may verify the accuracy of the extracted region in the new document generated by document generation module 140. In one embodiment, the verification module 150 may convert the original document and the new document generated by document generation module 140 into bitmap images for comparison, as described below with respect to FIG. 3.

Figure 3:
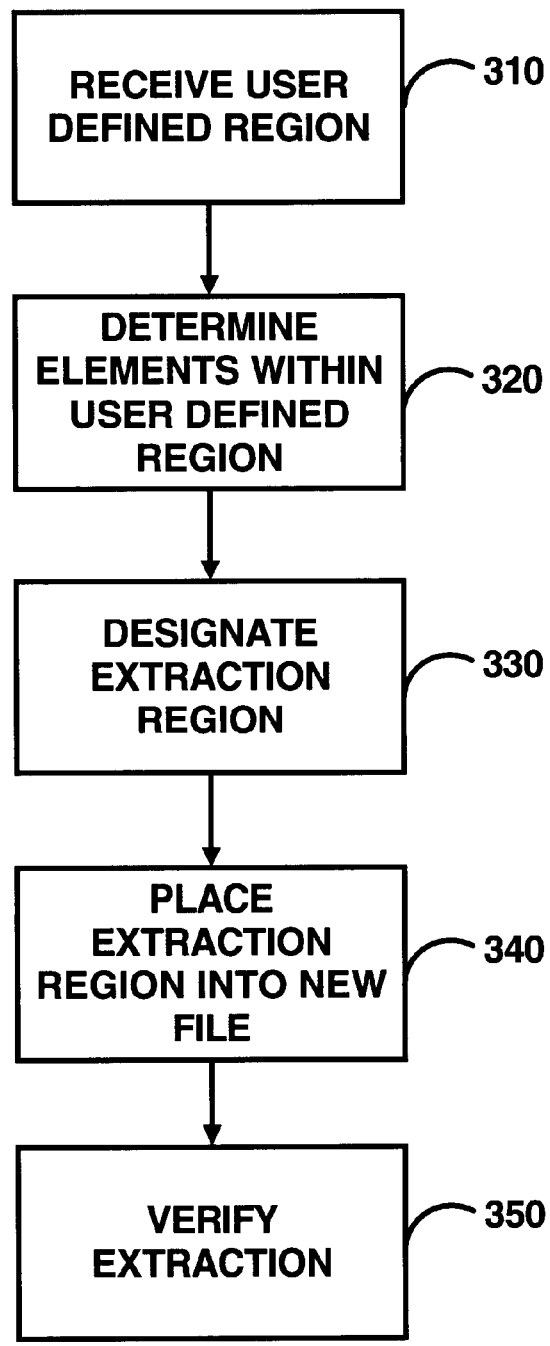
FIG. 3 is a flow diagram illustrating an exemplary embodiment of a method for extracting a section of a portable document format page.

The processing module 160 may execute the processes described with respect to FIG. 3 below, using instructions received from modules 110, 120, 140 and 150. For example, the processing module 160 may increase the size of the user defined region based on rules of inclusion received from the section determination module 120. An example of an inclusion rule is to fully include all elements that intersect the user defined region.

Figure 2:
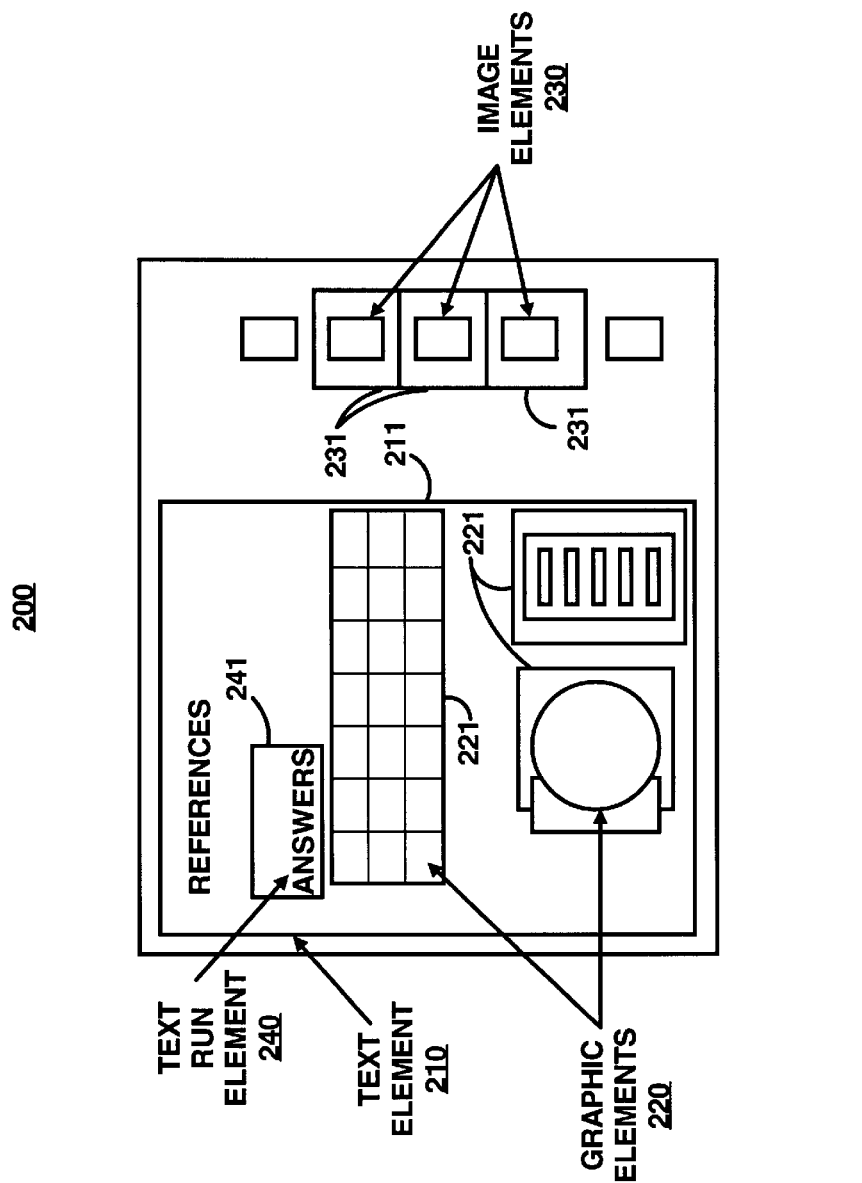
FIG. 2 illustrates an example of the structure of a portable document format document.

FIG. 2 illustrates an example of the structure of a pdf document. A pdf document 200 may include a text element(s) 210, a graphic element(s) 220 and image element(s) 230. The text element(s) 210 consist of text runs, which are runs of characters with the same attribute. A text run element 240 is a representation of a text run. Graphic elements 220 are arbitrary shapes made up of a sequence of straight lines, rectangles and cubic Bezier curves. Image elements 230 are sequences of pixels obtained by scanning the image arrow in row or column. Each element 210, 220, 230 may exist within its corresponding bounding box 211, 221, 231.

Bounding boxes are rectangles which surround objects in a document, and may refer to the smallest rectangle which entirely encloses the object on a page. The bounding box location and size for each element may be obtained, for example, through ADOBE's ACROBAT™ Software Development Tool Kit Application Programmer Interface, where a bounding box is guaranteed to encompass the element, but is not necessarily the smallest box that contains the element. To achieve higher accuracy of extraction result, a bounding box may be modified to be the smallest bounding box containing the element. For example, for a rectangular shaped graphic element, the bounding box may be modified to be the outline of the rectangle itself.

Bounding boxes are invisible to a viewer of a document. In the exemplary pdf document 200, text element 210 exists within bounding box 211, each of the graphic elements 220 exists within its associated bounding box 221 and each image elements in 230 exists within its associated bounding boxes 231. FIG. 3 is a flow diagram illustrating an exemplary embodiment of a method for extracting a section of a portable document format ("pdf") page. It will be appreciated that the process described with regard to FIG. 3 does not require all of the steps described and the order of the steps may vary depending on design.

At step 310, the extraction tool 100 receives an indication of a user defined region of a pdf page for extraction. In one embodiment, the user may draw a rectangle or other shape around a region of interest to the user to identify the region for extraction. Such a rectangle or shape is referred to as a selection marquee. In one embodiment, the user may use an object recognition tool to identify the region for extraction. In one embodiment, a user may use a graphic select tool that is available in ADOBE ACROBAT™ to draw the region of interest. The user may then click on the extraction processing icon for module 160 of the extraction tool 100 from a menu or toolbar. In one embodiment, the object recognition tool is a part of the input/output module 110.

At step 320, the extraction tool 100 may determine what elements of the original pdf page are within the user defined region for extraction received through input/output module 110. In one embodiment, the section determination module 120 determines what elements of the original pdf are within the user defined region for extraction. Since the bounding boxes 211, 221, 231 of elements are not visible to the user and a bounding box may be bigger than the actual element the region of interest chosen by the user may not include the all of the element's bounding box. Thus, the section determination module 120 may apply inclusion (or alternatively, exclusion) rules to determine which elements should be extracted based on the user defined region of interest.

In one embodiment, the inclusion rules may be based on the type of element. For example, a graphic or image element 220, 230 may be determined to be within the extraction region only if its entire bounding box 221, 231 is within the user defined region. Thus, if the bounding box 221, 231 of a graphic or image element 220, 230 intersects with the user defined region, but is not completely within the user defined region, the graphic or image element 220, 230 will not be included in the extraction process.

In one embodiment, a text element 210 or part of the text element 210 may be included in the extraction region if all or a part of its bounding box 211 intersects with the user defined region of interest. In one embodiment, if the bounding box 211 of the text element 210 intersects the user defined region, the section determination module 120 may evaluate whether the sub-elements, or text-run elements 240, of the text element 210 are within the user defined region. If a text-run element's bounding box 241 is completely within the user defined region, or if any part of the text-run element's bounding box intersects the user defined region, the user defined region of interest may be expanded to include the entire bounding box of the text-run element in the region for extraction.

Since bounding boxes of text run elements 240 are sometimes much larger than the text itself, the user defined region may not include the entire bounding box of the text run element 240. Thus, including any text run element 240 that intersects the user defined region of interest would help to include all of the elements chosen by the user for extraction.

At step 330, the extraction tool 100 may designate an extraction region. At the end of the determination step 320, the extraction region may be defined to include all of the elements determined to be included in the extraction.

At step 340, the extraction tool 100 may place the extraction region into a new file. In one embodiment, the document generation module 140 may create a second pdf document and insert the extracted region into the second pdf. In another embodiment, the document generation module 140 may insert the extraction region into an already existing second pdf, or a desktop publishing software document, such as, for example, a ADOBE FRAMEMAKER™ or ADOBE INDESIGN™ document. In one embodiment, the user may be asked to choose a file into which the extraction region may be inserted when the user requests the extraction of a selected region.

At step 350, the extraction tool 100 may check the extracted region in the second pdf document for differences from the user defined region in the original file. In one embodiment, the verification module 150 may verify the accuracy of the second pdf document by converting the original document extraction region, defined at step 330, to a first bitmap image and the second pdf document's extraction region to a second bitmap image. After aligning the two bitmaps, the verification module 150 may then compare the second bitmap image to the first bitmap image, bit by bit.

If there are differences between the two images, the extraction tool 100 may inform the user of the differences by presenting the user with a message through input/output module 110. For example, the extraction tool 100 could attach a verification message to the second pdf document letting the user know that there are differences between the extracted image placed in the second pdf document and the extraction region defined in the original pdf document.

Figure 4:
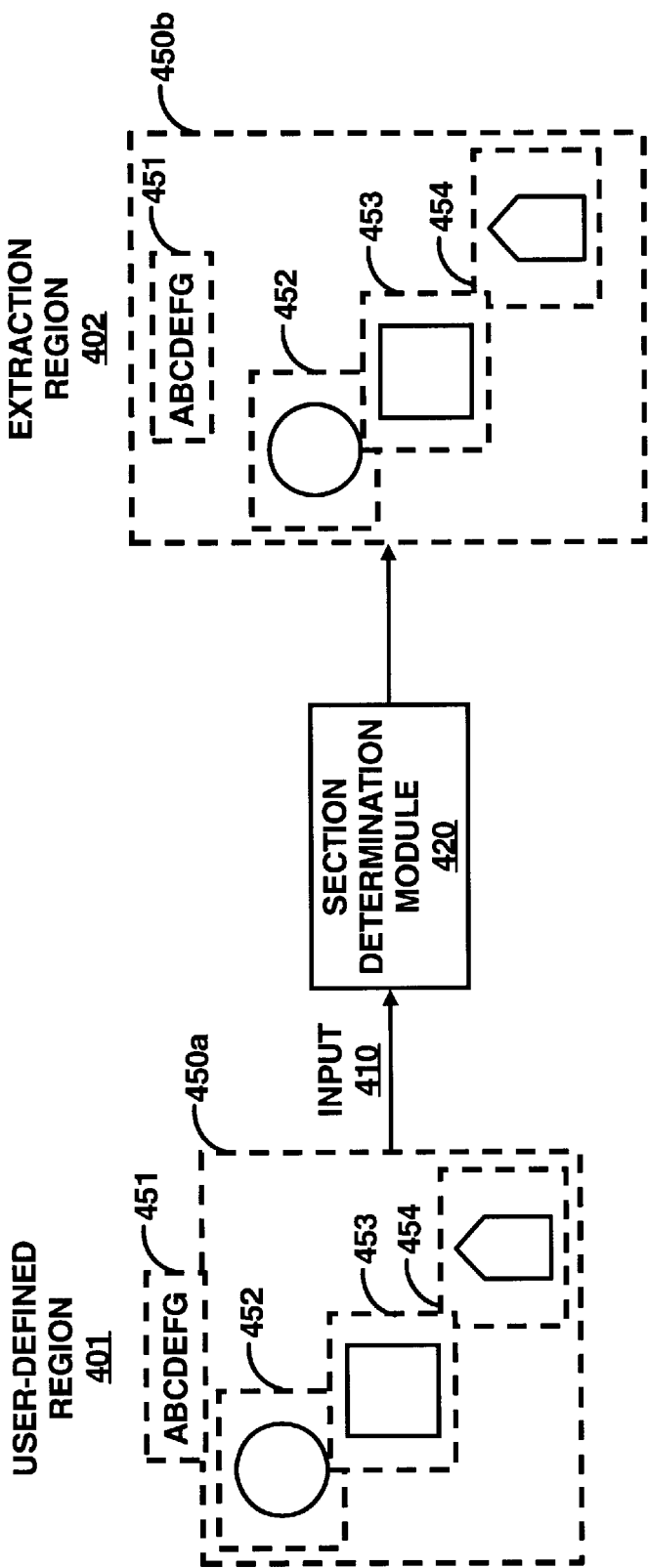
FIG. 4 is a block diagram illustrating an example of an extraction region determination process.

FIG. 4 is a block diagram illustrating an example of an extraction region determination process. A document 401 may include graphic or image elements 452–454 and text element 451. After the user indicates a user defined region 450a, the user defined region is input 410 into the section determination module 420. The section determination module 420 determines which elements of document 401 should be included in the user defined region. As shown, the user defined region 450a, is expanded to include a text run element 451 when the extraction region 450b is designated 330, although text run element 451 only intersected the user defined region 450a.

The method for extracting a user defined region described allows a user to select a region in a pdf document and select the option of extracting the region. The extraction tool 100 needs no further interaction from the user. The tool 100 allows a user to reuse selected content of a pdf document without having to learn or perform complicated processes.

Steps 310–350, described above, may be compiled into computer programs. These computer programs can exist in a variety of forms both active and inactive. For example, the computer program can exist as software comprised of program instructions or statements in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical or magneto-optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. These changes and others may be made without departing from the spirit and scope of the invention.

What is claimed is:

1. A method of extracting a section of a page from a portable document format file ("pdf") comprising:

receiving indication of a user-defined region on a pdf file page;

determining if one or more elements on the pdf page are within the user-defined region;

designating an extraction region including all elements determined to be within the user-defined region; and placing the extraction region into a new file.

2. The method of claim 1, wherein determining if one or more elements are within the user-defined region comprises applying extraction determination rules to each element based on element type.

3. The method of claim 2, wherein the element type comprises at least one of graphic element, image element and text element.

4. The method of claim 2, wherein applying the extraction determination rules comprises:

including a graphic element within the extraction region if a bounding box of the graphic element is within the user-defined region; and including an image element within the extraction region if a bounding box of the image element is within the user-defined region.

5. The method of claim 2, wherein applying the extraction determination rules comprises:

including a text element within the extraction region if a bounding box of the text element is within the user-defined region;

evaluating if sub-elements of the text element are within the user-defined region if the text element intersects the user-defined region;

including a sub-element of the text element if the sub-element is within the user-defined region; and expanding the user-defined region to include a sub-element of the text element if the sub-element of the text element intersects the user-defined region.

6. The method of claim 1, further comprising verifying the accuracy of the extracted user-defined region in the new file.

7. The method of claim 6, wherein verifying the accuracy of the extracted user-defined region in the new file comprises converting the pdf file page into a first bitmap image and the extracted user-defined region in the new file into a second bitmap image and comparing the first bitmap image to the second bitmap image bit by bit to confirm the accuracy of the extraction.

8. The method of claim 7, further comprising presenting the user with a message regarding differences between the pdf file page and the extracted user-defined region in the new file if there is a difference between the first bitmap image and the second bitmap image.

9. The method of claim 1, wherein receiving the indication of the user-defined region on the pdf file page comprises receiving an input of a user-defined region drawn on the pdf file page.

10. The method of claim 1 wherein receiving the indication of the user-defined region comprises receiving an user selection of a button on the pdf screen after the user draws the user-defined region on the pdf file page.

11. The method of claim 1 wherein the new file comprises one of a portable document format file and a desktop publishing software file.

12. A system for extracting a section of a page of a portable document format file comprising:

means for receiving indication of a user-defined region on a pdf file page;

means for determining one or more elements on the pdf page are within the user-defined region;

means for designating an extraction region including all elements determined to be within the user-defined region; and means for placing the extraction region into a new file.

13. The system of claim 12, wherein the means for determining if one or more elements are within the user-defined region comprises means for applying extraction determination rules to each element based on element type.

14. The system of claim 13, wherein the means for applying the extraction determination rules comprises:

means for including a graphic element within the extraction region if a bounding box of the graphic element is within the user-defined region; and means for including an image element within the extraction region if a bounding box of the image element is within the user-defined region.

15. The system of claim 13, wherein the means for applying the extraction determination rules comprises:

means for including a text element within the extraction region if a bounding box of the text element is within the user-defined region;

means for evaluating if sub-elements of the text element are within the user-defined region if the text element intersects the user-defined region;

means for including a sub-element of the text element if the sub-element is within the user-defined region; and means for expanding the user-defined region to include a sub-element of the text element if the sub-element of the text element intersects the user-defined region.

16. The system of claim 12 further comprising:

means for verifying the accuracy of the extracted user-defined region in the new file.

17. The system of claim 16, wherein the means for verifying the accuracy of the extracted user-defined region in the new file comprises means for converting the pdf file page into a first bitmap image and the extracted user-defined region in the new file into a second bitmap image and means for comparing the first bitmap image to the second bitmap image bit by bit to confirm the accuracy of the extraction.

18. The system of claim 17, further comprising means for presenting the user with a message regarding differences between the pdf file page and the extracted user-defined region in the new file if there is a difference between the first bitmap image and the second bitmap image.

19. A computer readable medium containing executable instructions which, when executed in a processing system, cause the system to perform a method comprising:

receiving indication of a user-defined region on a pdf file page;

determining if one or more elements on the pdf page are within the user-defined region;

designating an extraction region including all elements determined to be within the user-defined region; and placing the extraction region into a new file.

20. The computer readable medium of claim 19 wherein the method further comprises verifying the accuracy of the extracted user-defined region in the new file.

* * * * *